Aug. 14, 1928.

J. A. DYKE 1,680,597

HEADER ATTACHMENT FOR SIDE DELIVERY HAY LOADERS

Filed Dec. 7, 1925

INVENTOR
J. A. Dyke
BY
ATTORNEY

Patented Aug. 14, 1928.

1,680,597

UNITED STATES PATENT OFFICE.

JOHN A. DYKE, OF CEDARVILLE, CALIFORNIA.

HEADER ATTACHMENT FOR SIDE-DELIVERY HAY LOADERS.

Application filed December 7, 1925. Serial No. 73,869.

This invention relates to improvements in agricultural machinery, and particularly to a device for loading hay cut and lying on the ground, into a wagon moving alongside.

The principal object of my invention is to provide a structure for the purpose in the form of an attachment which may be applied to an ordinary header, upon the removal of certain parts thereof, and which picks up the hay and deposits it onto the draper of the header from in front of the machine before the team of animals or other draft means, and the machine, pass over the hay. This of course leaves the hay in better condition than is the case with other hay loaders.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
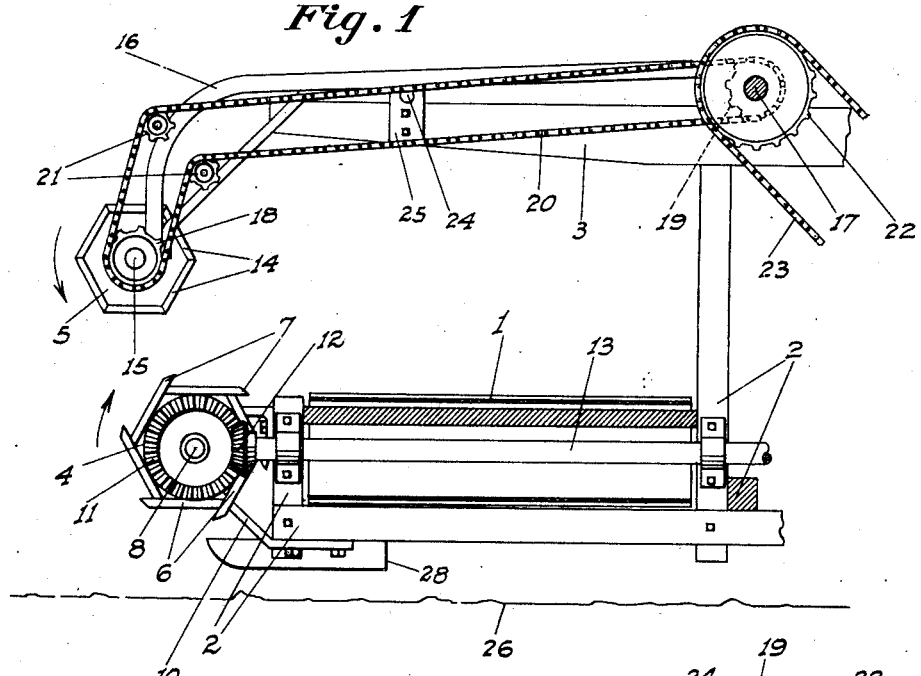
Fig. 1 is a side elevation of my improved hay loading structure, shown in connection with the adjacent portions of the header frame and draper.
Figure 2:
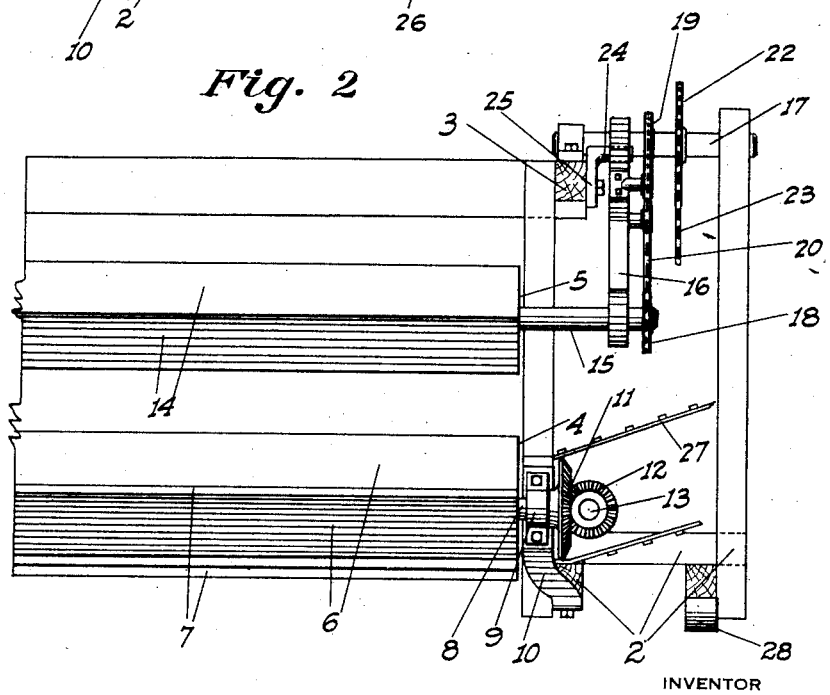
Fig. 2 is a fragmentary front end view of the device.

Referring particularly to the numerals of reference on the drawings, 1 denotes the transverse draper at the front end of the header, supported by the usual framework 2, which also supports the reel supporting beams, one of which is shown at 3. In applying my attachment I remove the reel, and also the sickle or mower structure ordinarily mounted ahead of the draper 1.

My loading device includes lower and upper rollers 4 and 5, extending transversely of the breast of the header for the full width thereof.

The periphery of the roller 4 is made of a number of flat elements 6, so as to form a polygonal sided member, one longitudinal edge of each element projecting beyond the adjacent edge of the adjacent element to form hay catching extensions 7. These projections extend in the direction toward which the roller is rotated, this direction being that which will cause the upper face of the roller to travel rearwardly toward the draper.

The roller 4 is mounted on a central shaft 8 which is journaled in suitable boxes 9 supported from the forward end of the frame 2 by brackets 10.

On one end of this shaft is fixed a bevel gear 11, engaged by a bevel pinion 12 fixed on the forward end of the usual jutman drive shaft 13 of the header. This drive means is so designed that with the rotation of the jutman shaft at its normal speed, the roller 4 will rotate at a somewhat slow speed, so that it will act to gather up the hay rather than simply rotate through it.

The roller 4 is disposed as close to the draper as is practicable, and its upper surface is substantially in horizontal alinement with the upper run of the draper.

The upper roller 5 is set a certain distance above and somewhat ahead of the lower roller 4. The periphery of the upper roller is also built up of a number of flat elements 14, but these merely abut against each other along their edges and do not overhang each other as is the case with the corresponding elements of the lower roller.

This roller is provided with a central shaft 15, each end of which is turnably mounted on the lower end of an arm 16. This arm projects upwardly from the roller for some distance, and is then bent to extend horizontally and rearwardly to a pivotal connection with a shaft 17.

This shaft is preferably one already provided on the header, and which is ordinarily associated with the usual reel, now removed as previously stated.

Fixed on the outer end of the shaft 15 is a sprocket wheel 18, while another sprocket wheel 19 is fixed on the shaft 17. A drive chain 20 passes over these sprockets, being maintained substantially parallel to the arm 16 from end to end by direction changing idler sprockets 21 mounted at suitable points on said arm.

To drive the shaft 17 at a speed such that the roller 5 will have a somewhat greater peripheral speed than that of the roller 4, another sprocket wheel 22 larger than the sprocket 19, is mounted on the shaft 17. A chain 23 passes around the sprocket 22, being driven from a suitable drive shaft already on the machine (not shown); the direction of drive being such that the direction of rotation of the roller 5 will be opposite to that of the roller 4.

The greater speed of the upper roller causes the latter to continually sweep the hay clear of the lower roller as the latter raises the hay, and thereby reduces the load and strain on the roller. The difference in speed is not enough however to cause the leaves etc. to be stripped from the hay stalks.

The arms 16 are free to move upwardly about their pivotal connection, so that the roller 5 may yield when a large volume of hay passes between the rollers. Downward movement of the arms 16 is limited by suitable stop means such as a transverse pin 24 projecting under each arm and mounted on a bracket 25 attached to the adjacent beam 3.

In operation, it will be evident that as the header moves forward and the rollers 4 and 5 are rotating, any hay on the ground 26 in the path of the rollers will be picked up by the extensions 7 of the roller 5, and with the cooperating movement of the other roller, will be passed rearwardly and delivered onto the draper 1 therebehind. From this draper the side draper 27 leads upwardly as usual, so that the hay after being deposited onto the horizontal draper, may be delivered directly into a wagon.

The purpose of making the rollers polygonal sided instead of cylindrical, is to provide jutting peaks which tend to grip the hay at intervals and positively move it rearwardly.

Shoes 8 are mounted on the lower longitudinal members 2 at each forward end thereof, to prevent contact of the roller 4 with the ground.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A hay gathering and loading device including with a frame and a draper mounted at the front end thereof, a pair of vertically spaced driven rollers mounted ahead of the draper, the upper periphery of the lower roller being substantially on a level with the draper, and continuous extensions projecting tangentially from the periphery of the lower roller at circumferentially spaced intervals.

2. A hay gathering and loading device including with a frame and a draper mounted at the front end thereof, a pair of oppositely driven and vertically spaced rollers mounted ahead of the draper; the lower roller having continuous longitudinal extensions projecting outwardly from the periphery of the same at circumferentially spaced intervals.

3. A hay gathering and loading device including with a frame, and a draper mounted at the front end thereof; a pair of oppositely driven and vertically spaced rollers mounted ahead of the draper; means supporting the lower roller in fixed relation to the draper and means supporting the upper roller in a manner to allow it to freely yield upwardly from and independent of the lower roller.

4. A hay gathering and loading device including with a frame and a draper mounted at the front end thereof, a pair of oppositely driven and vertically spaced rollers mounted ahead of the draper, said rollers being built up of a number of flat elements to form polygonal sided structures having a plurality of longitudinal and continuous peaks disposed farther from the axes of the rollers than the remainder of their peripheral surfaces.

5. A hay gathering and loading device including with a frame and a draper mounted at the front end thereof, a pair of vertically spaced driven rollers mounted ahead of the draper, the lower roller being built up of a number of flat elements to form a polygonal structure, each element along one edge projecting outwardly of the adjacent element to form continuous hay-engaging extensions.

In testimony whereof I affix my signature.

JOHN A. DYKE.